March 27, 1934.  W. LUDENIA  1,952,326
SHORT WAVE SIGNALING APPARATUS
Filed Aug. 23, 1930
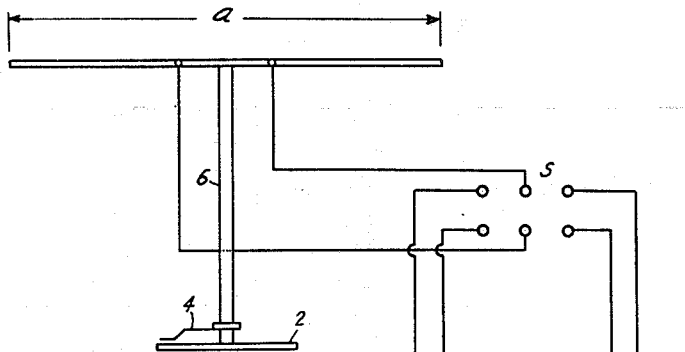
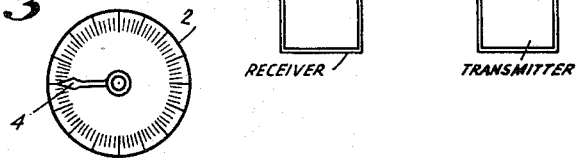
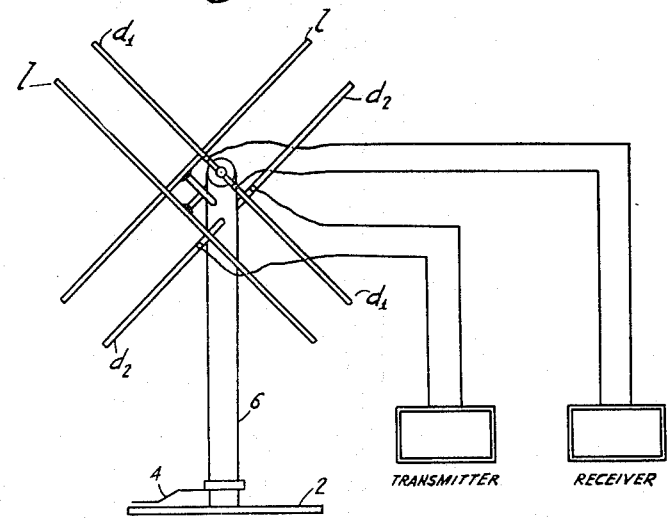
INVENTOR
WERNER LUDENIA
BY
ATTORNEY Patented Mar. 27, 1934

1,952,326

UNITED STATES PATENT OFFICE

1,952,326

SHORT WAVE SIGNALING APPARATUS

Werner Ludenia, Berlin, Germany, assignor to Radio Corporation of America, a corporation of Delaware Application August 23, 1930, Serial No. 477,345
In Germany December 21, 1929

2 Claims. (Cl. 250—11)

It is known that the rays emanating from a bar-like radiator one-half wave length long are polarized, i. e. travel in one plane only. If transmitting and receiving radiators are disposed parallel to one another, there is accordingly obtained a maximum of the sound intensity at the receiver, and, if both are at right angles to one another there is produced a minimum of receiving energy.

This fact may be utilized to obtain for the purposes of technical navigation a sharp direction finder. It is herewith proposed to equip the transmitter or receiver or both at the same time with bar-like radiators which are mounted on a revolving frame in the manner that they may be turned in the horizontal plane, a scale device being attached at the same time to these dipoles which indicates the position of the angle prevalent at that time.

In the accompanying drawing which is illustrative only of the present invention, Figure 1 illustrates a half wave length oscillator adapted to be rotated and coupled to either a receiver or to a transmitter, Figure 2 illustrates a pair of simultaneously rotatable one-half wave length antennæ simultaneously coupled to transmitting and receiving apparatus, and, Figure 3 is a plan view of a scale indicating the rotation of the antennæ of either Figure 1 or Figure 2.

Now, the arrangement according to Figure 1 may be used simultaneously as transmitter and receiver in that in the one instance an exciter is connected as shown to the dipole and in the other instance a rectifier depending upon the position of switch s.

It is preferable, however, to equip transmitter and receiver according to Figure 2 with one dipole each, $(d^1 d^2)$. In this case the dipoles are best arranged at right angles to one another so that a mutual disturbance of the fields cannot occur.

Another suitable alternative as also shown in Figure 2 consists in supporting a bar-like conductor 1, having a length of $\lambda/2$, parallel with the dipoles $(d)$ at a distance of $\lambda/4$, $3\lambda/4$, $5\lambda/4$, or any odd number of quarter wave lengths in a manner such that it is turned at the same time with the dipole. In that case there is obtained when turning the arrangement by 360° a single maximum. The bar-like conductor may also be developed as surface. A scale 2, and pointer 4 are provided for the dipole rotatable support 6 to indicate the position of the cooperating transmitting receiving station.

I claim:

1. A directional transmitter and receiver comprising a pair of dipoles fixed at right angles to one another and mounted on a rotatable member, a pointer fastened to said rotatable member, a scale fixed adjacent to said pointer, said rotatable member being arranged to rotate both of said dipoles simultaneously and to maintain them in fixed relation to each other at all angles of rotation, a receiver connected to one of said dipoles and a transmitter connected to the other of said dipoles.

2. A directional transmitter and receiver comprising a pair of dipoles fixed at right angles to each other, a reflector in the form of a conductor a half wave length long disposed an odd quarter of a wave length away from and parallel to each dipole, said dipoles and reflectors being mounted on a rotatable member arranged to rotate said dipoles and reflectors simultaneously and to maintain them in fixed relation to each other at all angles of rotation, a receiver coupled to one of said dipoles and a transmitter coupled to said other dipole.

WERNER LUDENIA.